Oct. 10, 1950 — H. W. TREVASKIS — 2,525,740
MASTER CYLINDER
Filed Nov. 4, 1947 — 2 Sheets-Sheet 1

Inventor
Henry William Trevaskis
by Benj. T. Rauber
his attorney

Oct. 10, 1950     H. W. TREVASKIS     2,525,740
MASTER CYLINDER
Filed Nov. 4, 1947     2 Sheets-Sheet 2
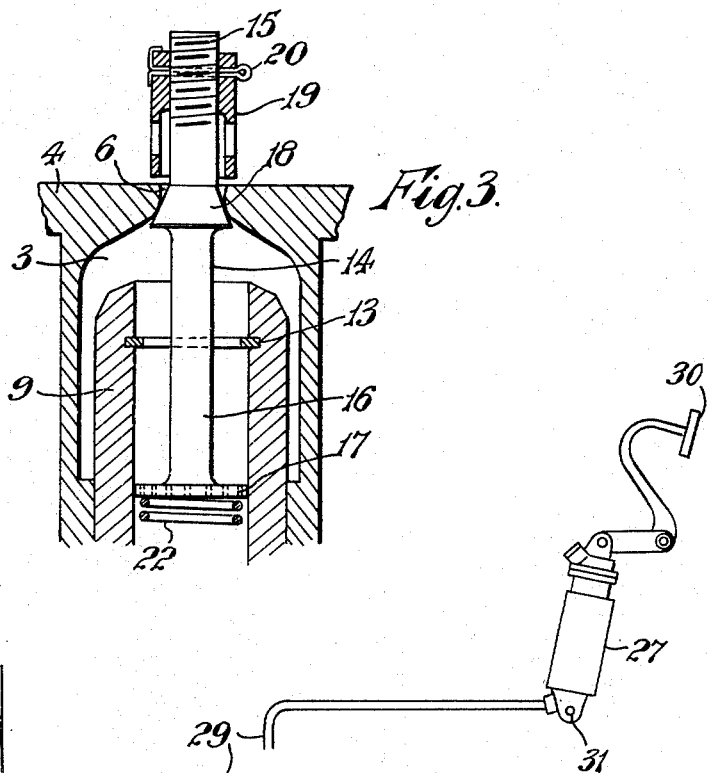
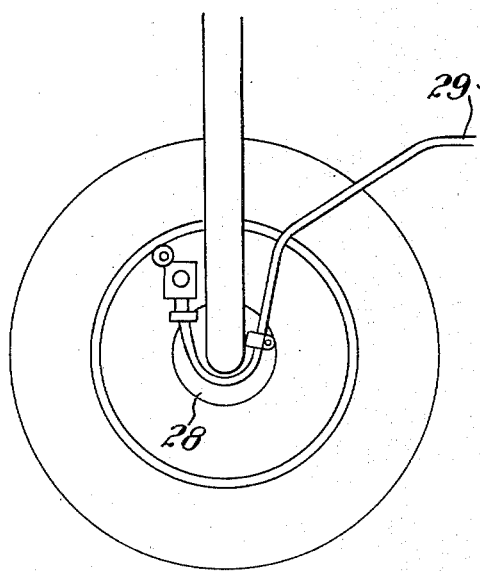
Inventor.
Henry William Trevaskis
by Benj. T. Rauber
his attorney Patented Oct. 10, 1950

2,525,740

UNITED STATES PATENT OFFICE 2,525,740

MASTER CYLINDER

Henry William Trevaskis, Solihull, England, assignor to Dunlop Rubber Company Limited, County of London, England, a British company Application November 4, 1947, Serial No. 783,910
In Great Britain November 19, 1946

6 Claims. (Cl. 60—54.6)

My invention relates to apparatus for the supply of fluid under pressure, particularly in aircraft braking systems, and it has for its object to provide improvements in the construction of such apparatus.

It is an object of the invention to provide a pump for the supply of fluid under pressure, particularly for use in a foot-operated brake control system for aircraft and other vehicles, which is provided with means for automatic replenishment.

According to the invention there is provided apparatus for the supply of fluid under pressure comprising a piston, a cylinder having associated therewith a reservoir adapted to contain fluid at substantially atmospheric pressure, a valve between the said cylinder and reservoir adapted to close during the working stroke, and means to open the valve near to the limit of the return stroke whereby the fluid in the cylinder is replenished to compensate for leakage losses or the like.

In order that the invention may be more clearly understood the same will be described with reference to the accompanying drawings in which:

Fig. 3 is an enlarged view of part of the apparatus showing the relative position of members during operation.

Fig. 4 is a diagrammatic view, only, of a fluid pressure braking system incorporating the invention.

Figures 1, 2:
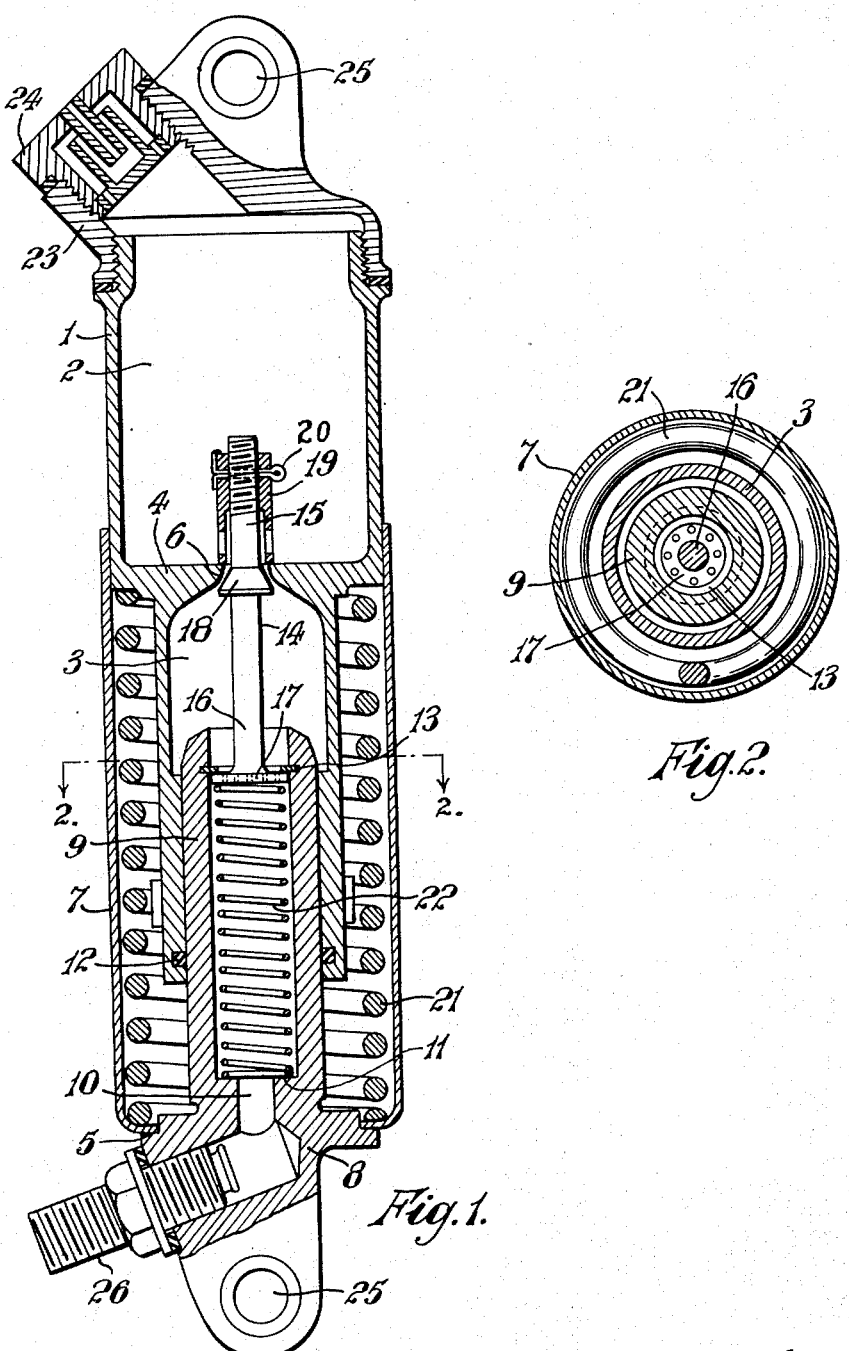
Fig. 1 is a sectional view of the apparatus in the inoperative position.
Fig. 2 is a sectional view on the line 2—2 of Fig. 1.

Referring to the drawings, the vessel 1 comprises a cylindrical reservoir 2 and a cylinder 3 of smaller diameter arranged to slide externally of a hollow piston 9 which is an extension of the base 8 of the apparatus.

Communication between the reservoir 2 and the cylinder 3 is provided by means of an aperture 6 in the dividing wall 4. A packing ring 12 is fitted into an annular groove in the inside of the cylinder 3.

The base portion 8 is provided with a flange 5 which acts as an abutment for one end of a strong outer spring 21, the other end of which abuts against a shoulder of the dividing wall 4.

Through the aperture 6 of the dividing wall 4 passes a rod 14 having its axis disposed longitudinally of the cylinder 3 and having its upper end 15 protruding into the reservoir 2 and its lower end 16 extending within the hollow piston 9. A disc 17, provided with a plurality of axial holes so that fluid can pass therethrough, is attached to the lower end of the rod and acts as an abutment for a light spring 22 which is concentrically disposed within the hollow piston 9. The disc also acts as a guide to maintain the rod 14 in axial alignment within the cylinder 3. An expansible split ring 13 is fitted into an annular groove in the inside wall of the hollow piston 9 and acts as a stop for the disc 17 on its withdrawal movement.

The lower side of the aperture 6 is provided with a seat for an enlarged part 18 of the slidable rod 14, which acts as a valve.

As shown in Fig. 3, the upper end 15 of the rod 14 is screw threaded to engage the screw threads of a collar 19 which is fitted to the valve stem so that the lower face of said collar provides an abutment which engages the upper surface of the dividing wall 4 to limit the opening of the valve on its seat. The collar 19 is axially adjustable on the stem 15 by means of the screw threads so that the clearance between the collar and the dividing wall can be adjusted, thus providing adjustment for the valve opening. After obtaining the required valve opening the collar 19 is locked to the valve stem by means of a split pin 20 passing through a hole in said collar and a slot in the valve stem.

To allow the passage of fluid from the reservoir 2 to the cylinder 3 through the aperture 6, when the collar 19 is in contact with the dividing wall 4, radial holes are provided in the lower portion of this collar and the bore of this portion of the collar is larger than the diameter of the valve stem 15.

The light spring 22 which at one end abuts the guide disc 17, has its lower end in abutment with a shoulder 11 formed at the lower end of the hollow piston 9. This end of the piston is provided with an outlet 10 into which is fitted a hose connector 26.

An end cover 23 is secured over the open end of the reservoir 2 and unto said end cover is fitted a removable filling plug and unspillable vent 24.

A cylindrical casing 7 enclosing the cylinder 3 and the spring 21, is fitted to the base portion 8, the reservoir 2 sliding within this casing during operation of the apparatus.

Fixing means 25 are provided at each end of the apparatus.

In operation, pressure is applied to the top of the apparatus or if desired to the bottom through the medium of links or rocking levers, whereby fluid is forced from the cylinder 3 through the hollow piston 9 and outlet 10 to the brake actuator. During this operation the cylinder slides externally of the piston, the spring 22 maintaining the valve 18 closed so that fluid cannot pass from the cylinder 3 to the reservoir 2. When the pressure is relieved the strong outer spring 21 returns the piston and cylinder to their inoperative positions, the light spring 22 maintaining the valve on its seat in sealing relation, so that fluid is drawn back again into the cylinder from the brake actuator.

Near the limit of the withdrawal stroke of the apparatus the disc 17 strikes the abutment 13, and further upward movement of the rod 14 is prevented so that the valve 18 is pulled off its seat to the open position. The dividing wall 4 between the cylinder and the reservoir then strikes the collar 19, so that further withdrawal movement of the cylinder is prevented, and the apparatus comes to rest with the valve in open position. Thus communication is established so that fluid can flow between the two chambers to compensate for volume changes of the fluid in the cylinder due to temperature changes, and also to compensate for leakage losses.

When incorporated in a fluid braking system on aircraft the apparatus is mounted on the rudder bar or other appropriate place in the aircraft. Fig. 4 is a diagrammatic arrangement of such a system in which a conventional fluid operated brake 28 is connected through the pressure fluid pipe 29 with a pump 27 in accordance with the present invention, which is mounted at 31 on a rudder bar and is operated by the pedal 30. As the steering of the aircraft on the ground is effected by applying differential brake pressures to the two wheels, two complete systems as shown in Fig. 4 are provided, one for each wheel of the aircraft. To bring the aircraft to a stop, foot pressure is applied simultaneously to each pedal 30.

Having described my invention what I claim is:

1. A master cylinder for supplying fluid under pressure which comprises a stationary, hollow, open-ended, piston having an outlet, a cylinder slidably mounted on said piston and having a reservoir for liquid and having a port between said reservoir and the interior of said cylinder, a spring acting on said cylinder to move it outwardly toward the open end of said piston, a closing valve for said port having a stem extending into said piston, means between said stem and said cylinder to limit the valve to open position when said cylinder is at the end of its out stroke, and a spring mounted to close said valve as said cylinder moves inwardly on said piston.

2. The master cylinder of claim 1 having means to adjust the cylinder relative to the valve whereby the valve has a predetermined opening when the actuating pressure is removed.

3. The master cylinder of claim 1 in which the cylinder actuating spring is a coil spring mounted about said piston.

4. A master cylinder comprising a piston having a central bore and an outlet from said bore for discharge of fluid under pressure, a cylinder slidable on said piston and a reservoir mounted on said cylinder, said cylinder having a central port to said reservoir, a spring positioned to restore said cylinder to its original position relative to said piston when actuating pressure is removed, a spring controlled non-return valve associated with said port and having a stem extending into the central bore of said piston and a guide on said stem within said central bore, said valve being so located relative to said cylinder that said port is not completely closed when the actuating pressure is removed to permit fluid to flow from said reservoir into said cylinder.

5. The master cylinder of claim 4 having a split ring fixed in the bore of said cylinder to engage and stop the guide on said piston stem when said cylinder moves outwardly relative to said piston.

6. The master cylinder of claim 4 having means to adjust the cylinder relative to the valve whereby the valve has a predetermined opening when the actuating pressure is removed.

HENRY WILLIAM TREVASKIS.

REFERENCES CITED

The following references are of record in the file of this patent:

UNITED STATES PATENTS

| Number | Name | Date |
|---|---|---|
| 1,620,115 | MacKenzie | Mar. 8, 1927 |
| 1,709,150 | Pieper | Apr. 16, 1929 |
| 1,847,604 | Finsen | Mar. 1, 1932 |
| 1,915,701 | Thomas | June 27, 1933 |
| 2,239,673 | Fowler | Apr. 29, 1941 |